United States Patent [19]
Sato

[11] Patent Number: 5,982,511
[45] Date of Patent: *Nov. 9, 1999

[54] IMAGE READING APPARATUS FOR PERFORMING LINE-SCANNING OF IMAGE INFORMATION OF AN ORIGINAL

[75] Inventor: Hiroshi Sato, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/689,065

[22] Filed: Jul. 30, 1996

[30] Foreign Application Priority Data

Aug. 4, 1995 [JP] Japan ..................... 7-219663

[51] Int. Cl.$^6$ ..................... H04N 1/04
[52] U.S. Cl. ..................... 358/475; 358/474
[58] Field of Search ..................... 358/475, 474, 358/471, 482, 483, 486, 497, 494, 505; 399/221; 355/66, 55; 359/629, 638, 639, 640, 634, 637, 487, 602, 833, 896; 250/208.1, 201.5; 369/44.23; 382/321

[56] References Cited

U.S. PATENT DOCUMENTS

| | | | |
|---|---|---|---|
| 4,907,858 | 3/1990 | Hara et al. | 359/629 |
| 4,973,836 | 11/1990 | Matsuoka | 250/201.5 |
| 4,991,030 | 2/1991 | Sato et al. | 358/474 |
| 5,283,698 | 2/1994 | Fukuzawa et al. | 359/896 |
| 5,568,315 | 10/1996 | Shuman | 359/487 |

FOREIGN PATENT DOCUMENTS 57-15564  1/1982  Japan .

*Primary Examiner*—Edward L. Coles
*Assistant Examiner*—Cheukfan Lee
*Attorney, Agent, or Firm*—Fitzpatrick, Cella, Harper & Scinto

[57] ABSTRACT

An image reading apparatus includes a predetermined surface on which a reading device or a recording medium is placed, an imaging device for focusing image information of an original on the predetermined surface, a scanning device disposed in an optical path between the imaging device and the original, a beam separating device disposed in an optical path between the imaging device and the predetermined surface, and an illuminating device a light beam from which is guided through the beam separating device to be focused by the imaging device so as to illuminate the original.

14 Claims, 3 Drawing Sheets

PROR ART

IMAGE READING APPARATUS FOR PERFORMING LINE-SCANNING OF IMAGE INFORMATION OF AN ORIGINAL

BACKGROUND OF THE INVENTION

1. Field of the Invention

The present invention relates to an image reading apparatus, and more particularly, to an image reading apparatus for focusing image information of an original at a predetermined magnification on a surface of a recording medium (photosensitive drum) or on a surface of an image reading element (line sensor) by means of an imaging device to form or read the image information of the original.

2. Related Background Art

A variety of proposals have been made heretofore as to the image reading apparatus arranged to line-scan image information of an original or the like in the sub-scanning direction, to focus the image information on a surface of a line sensor (CCD) as an image reading element (solid state image sensing device), and to utilize output signals obtained from the line sensor to read the image information of the original or the like.

FIG. 1 is a schematic drawing of the major part of a conventional image reading apparatus of this kind. In FIG. 1, an original 58 on an original glass plate 51 is illuminated by an illuminating light source (linear light source) 55, a plurality of reflectors 56 provided around the illuminating light source 55, etc., the image information of the original 58 thus illuminated is guided through a slit 52 and then via first, second, and third mirrors 53a, 53b, 53c for scanning to be focused on the surface of line sensor 57 by an imaging lens 54, and the image information of original 58 is then read.

In the same drawing, a method for scanning (or reading) the image information of original 58 in the sub-scanning direction is, for example, one for moving the first, second, and third mirrors 53a, 53b, 53c for scanning in the direction of arrow A in the drawing (in the sub-scanning direction) while maintaining a constant relation among them. Scanning velocities of the respective scanning mirrors 53a, 53b, 53c at this time are set so that, for example supposing the velocity of the first mirror 53a is v, the scanning velocities of the second and third mirrors 53b, 53c are v/2.

In this construction, the image information formed on the surface of the line sensor 57 is converted (or photoelectrically converted) into an electric signal, and the electric signal is used for a variety of purposes as information of the image reading apparatus; for example, in some cases the electric signal is sent to an output device (not shown) to perform output of image information as a print output or in other cases the electric signal is sent to a memory device (not shown) to store the input image information.

The conventional image reading apparatus as described above, however, had the following problems.

(1) The first mirror 53a moving at the scanning velocity v is normally made in a unit form integrally with the illumination light source 55, the reflectors 56, etc., which is usually scanned (or moved) in the direction of arrow A in the drawing (in the sub-scanning direction). Accordingly, the conventional image reading apparatus must incorporate the illumination light source 55, the plural reflectors 56, and so on in the optical path between the surface of original 58 and the first mirror 53a, and therefore, the distance L becomes long inevitably between the surface of original 58 and the first mirror 53a, which results in increasing the size of the apparatus itself in the direction of the height.

(2) Since the illumination light source 55 is in the integral unit with the first mirror 53a and moves at high speed in the sub-scanning direction, a load is exerted on the tube itself, the filament, and so on of the illumination light source 55 by impact at start of scanning, vibration at stop of scanning, etc., which decreases the life of the light source.

(3) The first mirror 53a and the second and third mirrors 53b, 53c are constructed in respective units different from each other and are moved at the respective scanning velocities v, v/2. If there occurs a small angular error of mirror arrangement in each unit, there will occur a phenomenon that the illumination position on the surface of original 58 illuminated by the illumination light source 55 and reflectors 56 is different from the reading position on the surface of original 58 read on the surface of line sensor 57 through the first, second, and third mirrors 53a, 53b, 53c. If the distribution of luminous intensity in the sub-scanning direction on the surface of the original 58 illuminated by the illumination light source 55 and reflectors 56 at this time is a sharp distribution with little flat portions, an eclipse will occur by failing to obtain an effective quantity of light due to the deviation between the illumination position and the reading position.

(4) Since the width of illumination by the illumination light source 55 in the sub-scanning direction is finite, such a reflection phenomenon will occur that reflected light from portions other than the reading position returns to the illumination light source 55, reflectors 56, etc. adjacent thereto and is again reflected thereby so as to illuminate the original surface again. Since this reflection phenomenon is dependent upon the density of original, it will cause degradation of linearity of the level of quantity of reading light.

SUMMARY OF THE INVENTION

For solving the above problems, an object of the present invention is to provide an image reading apparatus that can readily achieve compactification of the entire apparatus, an increase of the life of light source, coincidence between the image reading position and the illumination position, compactification of the light source, prevention of reflection of the illumination system, and so on by such an arrangement that a light beam emitted from an illumination means located near another position conjugate with the image plane of the imaging means is guided through a beam separating means positioned in the optical path between the imaging means and a recording medium (photosensitive drum) or between the imaging means and an image reading element (line sensor) to illuminate the original through the imaging means.

The image reading apparatus of the present invention is an image reading apparatus arranged to scan image information of an original mounted on a surface of an original table by scanning means, thereafter to focus the image information on a surface of a recording medium or on a surface of an image reading element by imaging means, and to form or read the image information of the original, wherein illuminating means is disposed near another position conjugate with an image plane of the imaging means and a light beam emitted from the illumination means is arranged to illuminate the original by the imaging means through beam separating means disposed in an optical path between the imaging means and the recording medium or between the imaging means and the image reading element.

Particularly, further features are as follows:

when the original is a faceup original, as shown in FIG. 4, the original is scanned by moving the illumination means in a parallel direction and the image reading element in a perpendicular direction at a same velocity with respect to the optical axis of the imaging means;

when the original is a faceup original, the original is scanned by moving the image reading element in a parallel direction and the illumination means in a perpendicular direction at a same velocity with respect to the optical axis of the imaging means;

when the original is a faceup original, the original is scanned by moving the imaging means in a perpendicular direction with respect to the optical axis of the imaging means.

Particularly, another feature is that the elements are arranged to illuminate the original obliquely with respect to the original surface, as shown in FIG. 5.

DETAILED DESCRIPTION OF THE PREFERRED EMBODIMENTS

Figure 2:
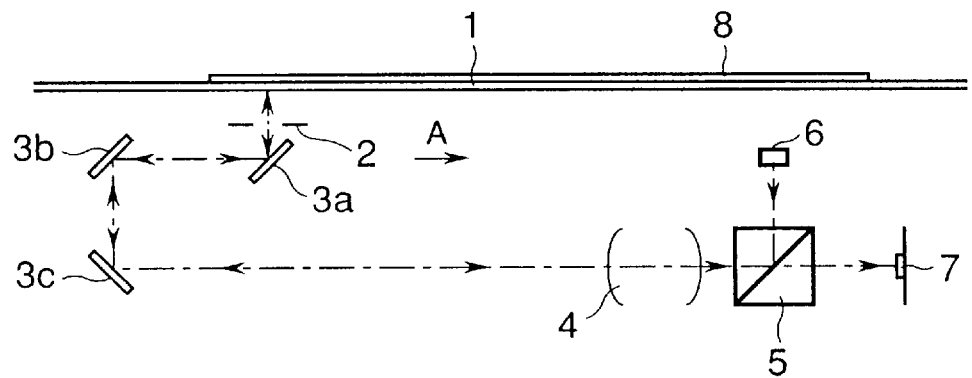
FIG. 2 is a schematic drawing of the major part of Embodiment 1 of the image reading apparatus according to the present invention.

FIG. 2 is a schematic drawing of the major part of Embodiment 1 of the image reading apparatus according to the present invention. In FIG. 2, reference numeral 1 designates an original glass plate, on which an original 8 is mounted. Numeral 2 denotes an elongate slit extending in the main scanning direction (or in the direction normal to the plane of FIG. 2), which interrupts stray light from the surface of the original 8. Symbols 3a, 3b, 3c are the first, second, and third mirrors, respectively, for scanning, which guide a beam of reflected light from the surface of original 8 to an imaging lens 4 as an imaging means described hereinafter to scan the surface of original 8 in the direction of arrow A in the drawing (or in the sub-scanning direction) as maintaining a predetermined relation.

The imaging lens 4 demagnifies the image information of the original 8 at a determined ratio to form an image thereof on a surface of line sensor (CCD) 7 as an image reading element (solid state image sensing device). In the present embodiment the direction of this image formation is referred to as a direction of normal projection. Further, the present embodiment uses a linear light source 6 as an illumination means as described below, which illuminates the reading position on the surface of original 8 by using the opposite path to the direction of normal projection, i.e., by using reverse projection.

Numeral 5 denotes a beam splitter (half mirror) of a prism type as a beam separating means, which is disposed in the optical path between the imaging lens 4 and the line sensor 7.

Numeral 6 is the linear light source (illumination light source) as an illumination means, which is a bar light source, for example, such as a halogen lamp or a fluorescent tube, and which is located near another position conjugate with the image plane of the imaging lens 4. Thus, the illumination means 6 is disposed near the position optically conjugate with the line sensor 7 with respect to the imaging lens 4.

The linear light source 6 in the present embodiment is of a line longitudinal in the main scanning direction, and the width thereof in the main scanning direction is equal to or more than the width of the line sensor 7 in the main scanning direction. In the present embodiment a reflector (not shown) is disposed behind the linear light source 6 to collect beams radiating backward from the linear light source 6, thereby enhancing the illumination efficiency. Each of the linear light source 6 and reflector (not shown) is an element of the illumination section.

Numeral 7 is a line sensor (CCD) as an image reading element, in which a plurality of light receiving elements are arrayed in a one-dimensional direction (the main scanning direction) and which reads the image information of the original 8 to convert (or photoelectrically convert) it into an electric signal.

Next explained are the original illuminating method (illumination system) and image reading method (reading system) according to the present embodiment.

In the present embodiment the light beam (illumination light) emitted from the linear light source 6 is reflected 90° (to the imaging lens 4) by the beam splitter 5 to be coincident with the optical axis of the optical path of normal projection for reading the image information. The illumination light reflected by the beam splitter 5 is incident to the imaging lens 4 in the reverse direction, travels via the third, second, and first mirrors 3c, 3b, 3a, and then is focused (or projected) by reverse projection onto the reading position on the surface of original 8. Thus, the illumination light illuminates the original 8 in the direction normal to the surface of the original 8. Since in the present embodiment the imaging lens 4 is used as a reducing system in the case of the normal projection, the illumination system achieves illumination of an enlarging system at this time, thereby effectively illuminating the reading image region.

The image information of the original 8 illuminated by the above original illumination method is then guided according to the image reading method similar to that in the conventional apparatus to travel via the first, second, and third mirrors 3a, 3b, 3c and to be focused by the imaging lens 4 on the surface of line sensor 7 through the beam splitter 5. Then the line sensor 7 reads the image information of original 8.

The illumination section having the illumination light source 6 is placed in the region on the side of the surface of the original 8 with respect to the optical axis of the imaging lens 4, but it may be placed in the opposite region.

As described above, the present embodiment is arranged to illuminate the reading position on the surface of original 8 by using the imaging light path for reading the image information in the opposite direction, as described above, that is, by using the imaging lens 4 in the reverse projection, thereby attaining the following features (effects).

(1) Since the unit including the first mirror 3a can be constructed without including the illumination section, the size of the entire apparatus can be decreased.

(2) By the arrangement wherein the light beam emitted from the linear light source 6 is used in the reverse projection and illumination of the surface of original 8 is carried out using the plural mirrors 3a, 3b, 3c for scanning, the linear light source 6 can be used in a stationary state, which is free of the impact, vibration, or the like due to movement and thus can increase the life of the light source.

(3) Since the light path of the illumination system and the light path of the reading system are arranged in a common light path, influence due to location errors of the scanning mirrors 3a, 3b, 3c is equal between them, and thus there fundamentally occurs no deviation between the illumination position and the reading position.

(4) Since the optical path of the illumination system is used as an enlarging system, the size of the linear light source 6 can be decreased.

(5) There occurs no reflection phenomenon, because the linear light source 6 and reflector do not have to be located near the surface of original 8.

Figure 3:
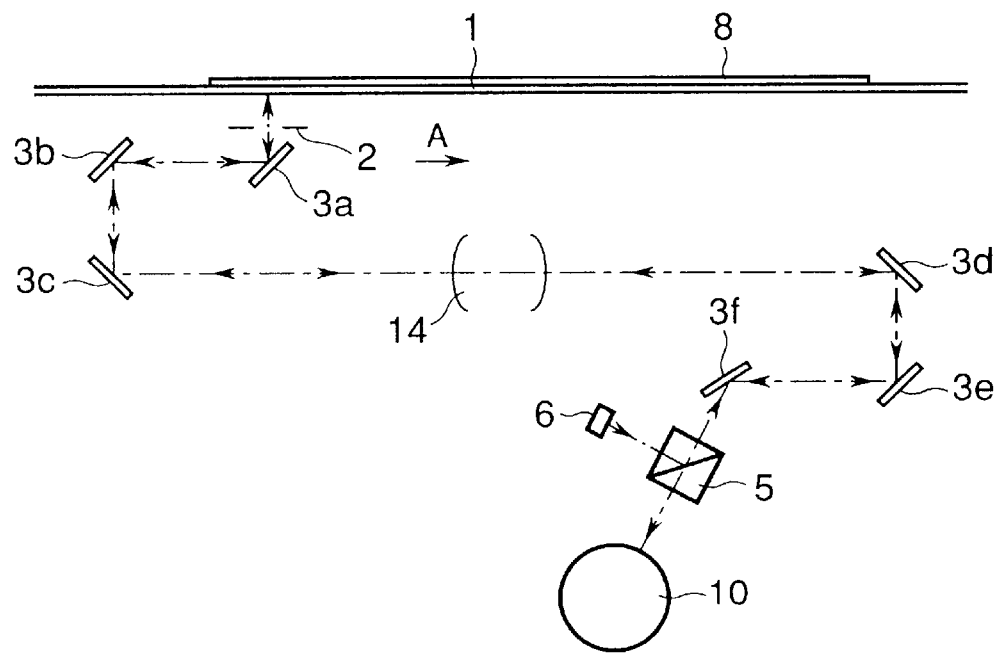
FIG. 3 is a schematic drawing of the major part of Embodiment 2 of the image reading apparatus according to the present invention.

FIG. 3 is a schematic drawing of the major part of Embodiment 2 of the image reading apparatus according to the present invention. FIG. 3 shows an optical arrangement when the recording medium is a photosensitive drum and the image information of the original is formed thereon. In FIG. 3, the same elements are denoted by the same reference numerals as those shown in FIG. 2.

In the drawing, reference numeral 14 designates a zooming lens capable of changing its magnification, as an imaging means, which covers ratios of from demagnification to magnification by moving at least a part of the lens upon zooming. Symbols 3d, 3e, 3f denote stationary path-bending mirrors, which suitably bend the optical path. Numeral 10 represents a photosensitive drum as a recording medium. In the present embodiment, the width of the linear light source 6 in the main scanning direction (or in the direction perpendicular to the plane of FIG. 3) is nearly equal to the width of the surface of the original 8 in the main scanning direction and the width in the sub-scanning direction is nearly equal to the width of each slit scan.

As described, the image reading apparatus using the photosensitive drum 10 as a recording medium is also arranged to illuminate the surface of the original 8 by using the imaging light path for reading the image information in the reverse direction, similarly as in previous Embodiment 1, i.e., by using the imaging lens 14 in the reverse projection, thereby achieving the same effects as in Embodiment 1.

Figure 4:
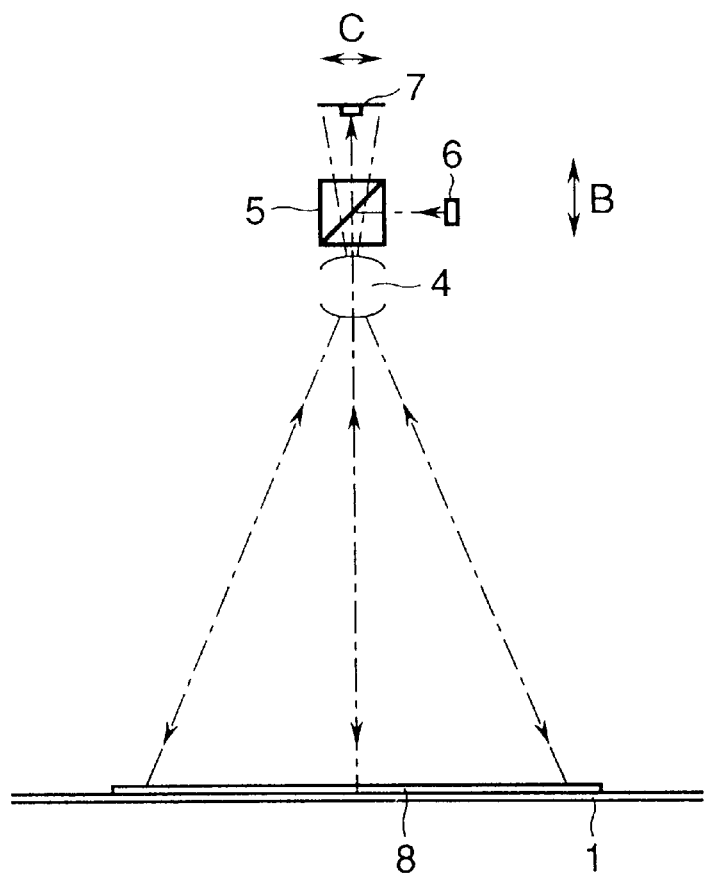
FIG. 4 is a schematic drawing of the major part of Embodiment 3 of the image reading apparatus according to the present invention.

FIG. 4 is a schematic drawing of the major part of Embodiment 3 of the image reading apparatus according to the present invention. FIG. 4 shows an optical arrangement for reading a faceup original or the like mounted on the surface of the original glass plate with an original surface (reading surface) thereof facing up. In the drawing the same elements are denoted by the same reference numerals as those shown in FIG. 2.

The present embodiment does not adopt the scanning of the original surface by the scanning mirrors as executed in previous Embodiments 1, 2, in order to prevent the size of the entire apparatus from increasing. In the present embodiment, scanning is carried out by scanning (or moving) the linear light source 6 in the direction of arrow B in the drawing (or in the direction parallel to the optical axis of the imaging lens 4) and the line sensor 7 in the direction of arrow C in the drawing (or in the direction perpendicular to the optical axis of the imaging lens 4) at a same velocity. For example, when the linear light source 6 is moved from down to up on the drawing, the line sensor 7 is moved from left to right on the drawing, thereby reading the image information on the surface of original 8.

In the present embodiment the line sensor 7 is placed on the transmission side of the beam splitter 5 while the linear light source 6 on the reflection side, but the locations may be switched. In this case the original is to be scanned by moving the line sensor 7 in the parallel direction and the linear light source in the vertical direction to the optical axis of the imaging lens 4 at the same velocity.

Further, another scanning method different from the above scanning method can be adopted; for example, scanning can be made by moving only the imaging lens 4 in the direction of arrow C in the drawing.

As explained, the present embodiment is directed to the image reading apparatus for reading the faceup original in the above manner, wherein the image information of the faceup original 8 can be read as scanning the surface of original 8 without using the scanning mirrors by moving the linear light source 6 and line sensor 7 at the same velocity in the predetermined directions or by moving only the imaging lens 4 in the predetermined direction, thereby further decreasing the size of the entire apparatus.

Figure 5:
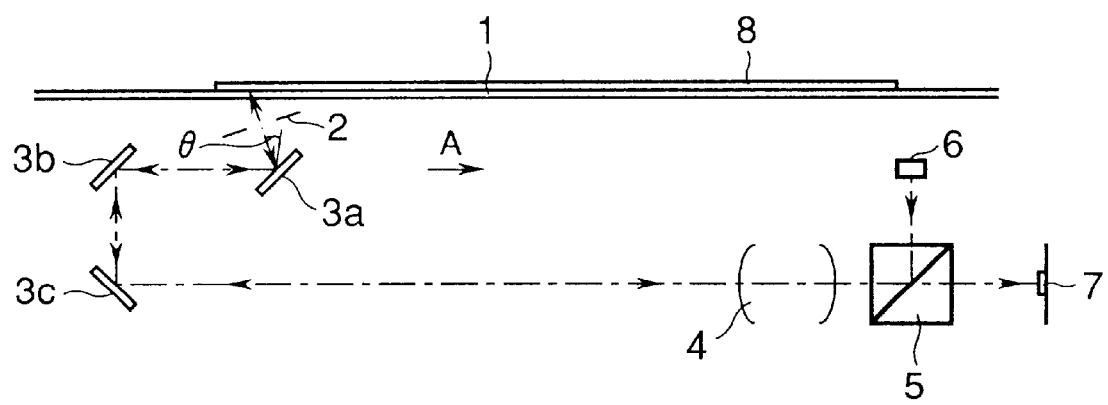
FIG. 5 is a schematic drawing of the major part of Embodiment 4 of the image reading apparatus according to the present invention.

FIG. 5 is a schematic drawing of the major part of Embodiment 4 of the image reading apparatus according to the present invention. In FIG. 5 the same elements are denoted by the same reference numerals as those shown in FIG. 2.

The present embodiment is different from foregoing Embodiment 1 in that the elements are arranged so that the illumination light is incident at an arbitrary angle $\theta$ ($\theta > 0$) with respect to the direction perpendicular to the surface of original 8 (or with respect to the direction normal to the surface of original 8) onto the surface of the original 8, i.e., so that it obliquely illuminates the surface of the original 8. The other structure and optical operation are substantially the same as those in Embodiment 1, thereby attaining the same effects.

Namely, foregoing Embodiment 1 was arranged to illuminate the surface of original 8 in the direction normal to the original surface. There occurs no problem if the original has a reflecting surface equivalent to a perfect diffuse surface. However, for example, if the original has glossiness, there is a possibility that reflected light of a regularly reflected component is incident to the reading system.

The present embodiment solved the above problem by properly setting the locations of the scanning mirrors 3a, 3b, 3c so that the illumination light from the linear light source 6 is incident at the arbitrary angle $\theta$ ($\theta > 0$) with respect to the direction normal to the surface of original 8, i.e., so that the illumination light obliquely illuminates the surface of original 8. Further, it is noted that the photosensitive drum 10 as a recording medium can also be used instead of the line sensor 7 of the present embodiment, similarly in previous Embodiment 2.

In each embodiment the beam splitter of the prism type is disposed in the optical path between the imaging lens and the photosensitive drum or between the imaging lens and the line sensor, but any optical member having the optical action equivalent to the beam splitter may be placed there as applying the present invention in the same manner as in each previous embodiment.

The present invention can achieve the image reading apparatus that can realize compactification of the entire apparatus, long-life and compact arrangement of the light source, coincidence between the image reading position and the illumination position, prevention of reflection of the illumination system, and so on by illuminating the original by the imaging means as guiding the light beam emitted from the illumination means disposed near another position conjugate with the image plane of the imaging means through the beam separating means placed in the optical path between the imaging means and the recording medium (photosensitive drum) or between the imaging means and the image reading element (line sensor), as described above.

What is claimed is:

1. An image reading apparatus comprising:

a linear slit disposed near an original;

a linear light source emitting a first light beam;

imaging means for focusing the first light beam along an optical path through the slit to fall with an oblique optical axis onto the original and be reflected from the original as a reflected light beam bearing image information of the original;

beam separating means disposed in the optical path between said light source and said slit, the first light beam passing through said beam separating means to reach said slit; and a line sensor, the reflected light beam passing through said slit and said beam separating means in sequence along the optical path, said reflected light beam being focused by said imaging means and then passed through said beam separating means and onto said line sensor.

2. An apparatus according to claim 1, wherein said light source is disposed near a position optically conjugate to said line sensor with respect to said imaging means.

3. An apparatus according to claim 1, further comprising scanning means disposed in the optical path between said imaging means and the original for causing the first light beam to linearly scan the original.

4. An apparatus according to claim 3, wherein said scanning means includes a mirror for scanning.

5. An apparatus according to claim 1, wherein said beam separating means is disposed in the optical path between said light source and said imaging means.

6. An image reading apparatus comprising:

a slit disposed near an original;

a linear light source for emitting a light beam to illuminate the original;

a line sensor for detecting the light beam reflected by the original so as to read out image information of the original; and optical means having a beam separation function, wherein said optical means guides the light beam emitted from said linear light source and incident thereon by way of a first optical path to illuminate the original from a direction inclined with respect to a direction perpendicular to the original surface through said slit and guides the light beam reflected by the original bearing the image information of the original through said slit toward said line sensor by way of a second optical path different from said first optical path.

7. An apparatus according to claim 6, wherein said optical means includes imaging means for focusing the light beam bearing the image information of the original, reflected by the original, onto said line sensor.

8. An apparatus according to claim 7, wherein said linear light source is disposed near a position optically conjugate to said line sensor with respect to said imaging means.

9. An apparatus according to claim 7 further comprising scanning means disposed in an optical path between the original and said imaging means to scan the image information of the original.

10. An apparatus according to claim 9, wherein said scanning means includes a scanning mirror.

11. An image forming apparatus comprising:

a slit disposed near an original;

a linear light source for emitting a light beam to illuminate the original;

a line sensor for detecting the light beam reflected by the original so as to read out image information of the original;

imaging means which guides the light beam emitted from said linear light source to illuminate the original from a direction inclined with respect to a direction perpendicular to the original surface through said slit and focuses the light beam bearing the image information of the original, reflected by the original and passed through said slit, onto said line sensor; and beam separation means so disposed in an optical path between said imaging means and said line sensor as to provide an optical path commonly used for illuminating the original with the light beam emitted from said linear light source and for reading out the image information of the original.

12. An apparatus according to claim 11, wherein said linear light source is disposed near a position optically conjugate to said line sensor with respect to said imaging means.

13. An apparatus according to claim 11 further comprising scanning means disposed in the optical path between the original and said imaging means to scan the image information of the original.

14. An apparatus according to claim 13, wherein said scanning means includes a scanning mirror.

* * * * *

UNITED STATES PATENT AND TRADEMARK OFFICE
CERTIFICATE OF CORRECTION

Figure 1:
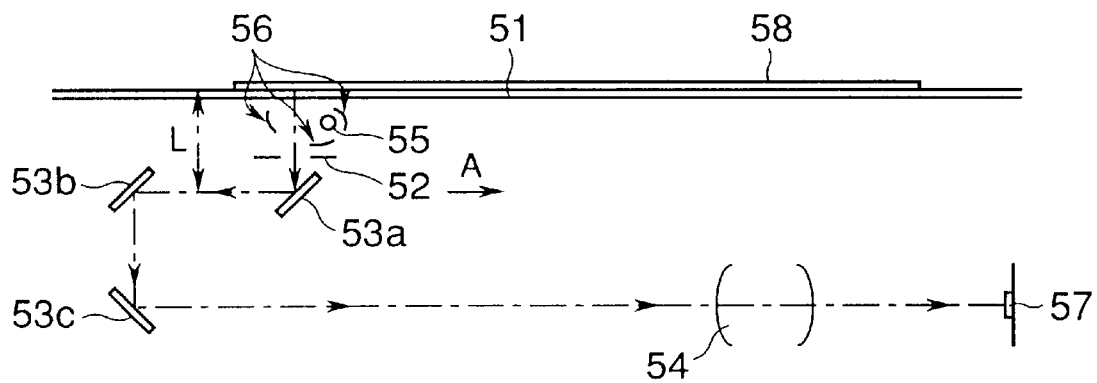
FIG. 1 is a schematic drawing of the major part of the conventional image reading apparatus.

PATENT NO.   :   5,982,511
DATED        :   November 9, 1999
INVENTOR(S)  :   HIROSHI SATO It is certified that error appears in the above-identified patent and that said Letters Patent is hereby corrected as shown below:

<u>IN THE DRAWINGS</u>:

Sheet 1 of 3, FIG. 1, "PROR" should read --PRIOR--.

Signed and Sealed this

Nineteenth Day of December, 2000

Attest:

Q. TODD DICKINSON

*Attesting Officer*     *Commissioner of Patents and Trademarks*